United States Patent [19]

Yuuki

[11] Patent Number: 5,224,158
[45] Date of Patent: Jun. 29, 1993

[54] TERMINAL APPARATUS

[75] Inventor: Akira Yuki, Fukuoka, Japan

[73] Assignee: Matsushita Electric Industrial Co. Ltd., Japan

[21] Appl. No.: 733,971

[22] Filed: Jul. 22, 1991

Related U.S. Application Data

[63] Continuation of Ser. No. 484,003, Feb. 22, 1990, abandoned, which is a continuation of Ser. No. 134,131, Dec. 15, 1987, abandoned.

[51] Int. Cl.$^5$ .................................... H04M 11/00
[52] U.S. Cl. .................................... 379/100; 379/97; 379/88
[58] Field of Search .................... 379/96–98, 379/100, 74, 79, 80, 82, 67, 88

[56] References Cited

U.S. PATENT DOCUMENTS

| | | | |
|---|---|---|---|
| 4,584,434 | 4/1986 | Hashimoto | 379/100 |
| 4,598,171 | 7/1986 | Hanscom | 379/80 |
| 4,660,218 | 4/1987 | Hashimoto | 379/93 |
| 4,794,637 | 12/1988 | Hashimoto | 379/100 |
| 4,800,439 | 1/1989 | Yoshino | 379/67 |

FOREIGN PATENT DOCUMENTS

| | | | |
|---|---|---|---|
| 62-260459 | 11/1987 | Japan | 379/100 |
| 62-281655 | 12/1987 | Japan | 379/100 |
| 62-281657 | 12/1987 | Japan | 379/100 |
| 2160072 | 12/1985 | United Kingdom | 379/100 |
| 2166624 | 5/1986 | United Kingdom | 379/100 |

OTHER PUBLICATIONS

Teleconnect, Nov. 1987, p. 190–Panasonic KX-F115 379-100.

Primary Examiner—James L. Dwyer
Assistant Examiner—Wing F. Chan

[57] ABSTRACT

A terminal apparatus carries out both of facsimile communication and automatic telephone answering operation which has the response message circuit for sending first and second response messages to a telephone circuit responding to calling signal; the first response message makes a brief response, and then when the caller wishes to make voice message, by the second message it is informed to caller that recording operation for message will be carried out now.

8 Claims, 4 Drawing Sheets

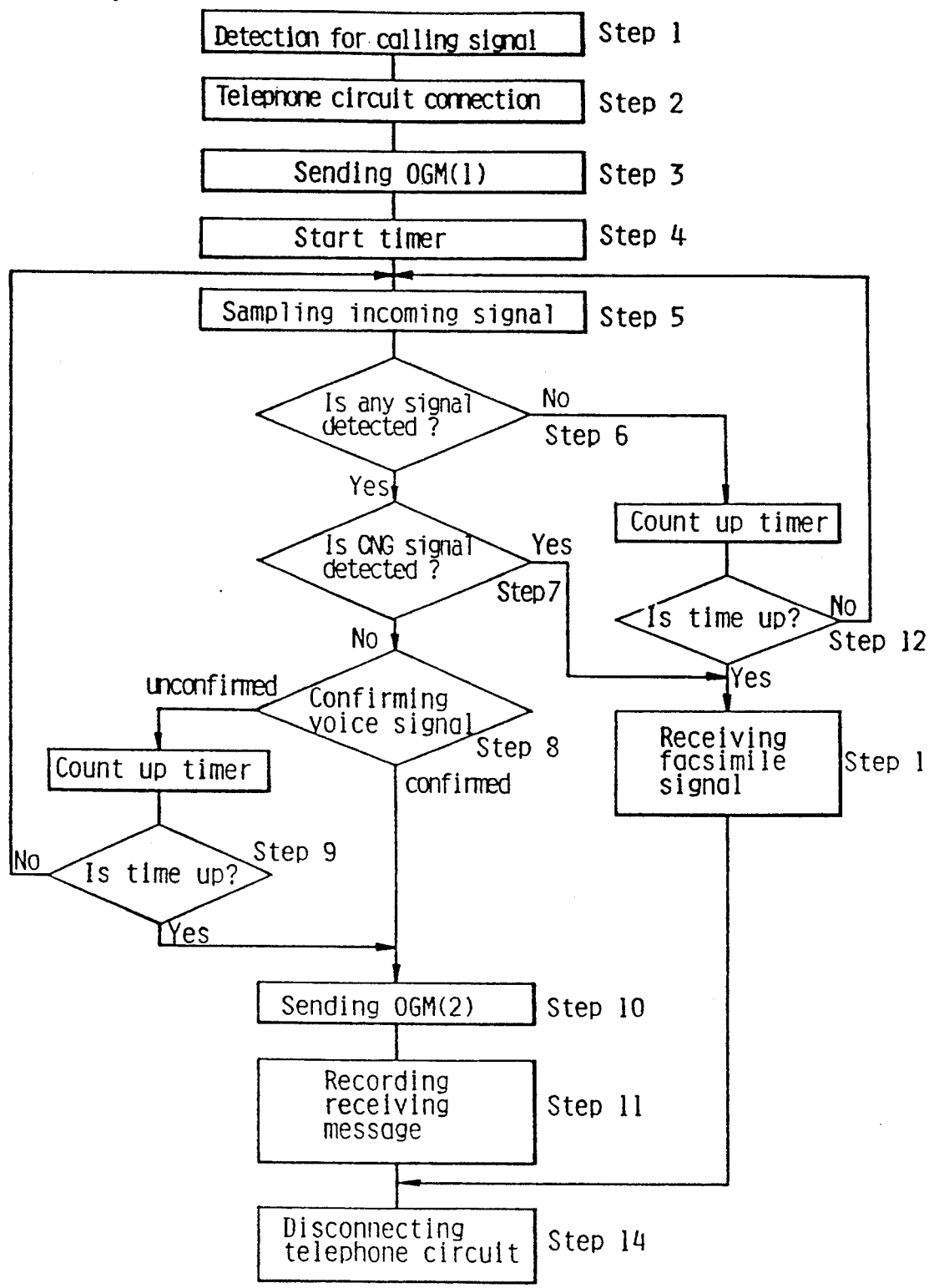

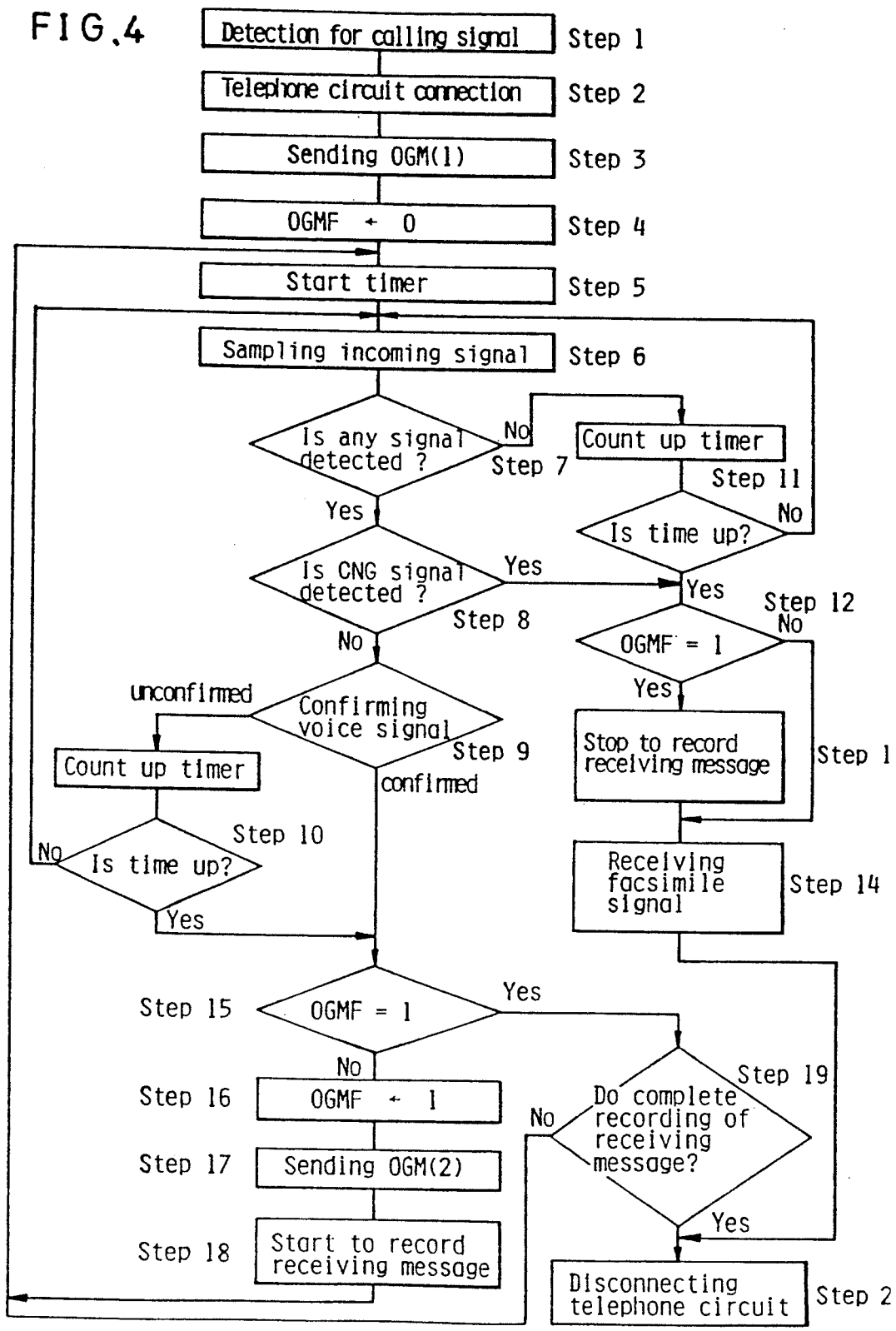

TERMINAL APPARATUS

This is a continuation of application Ser. No. 07/484,003, filed on Feb. 22, 1990, which was abandoned upon the filing hereof which is a continuation of application Ser .No. 07/134,131 filed Dec. 15, 1987, now abandoned.

FIELD OF THE INVENTION AND RELATED ART STATEMENT

1. Field of the Invention

The present invention relates to a terminal apparatus which transmits and receives a voice signal and an image signal. More specifically, the invention encompasses a telephone answering machine with a built-in facsimile machine that has automatic switchover.

2. Description of the Related Art

A known terminal apparatus has a facsimile device for carrying out image communication, as well as an automatic telephone answering machine for recording a message from a caller.

When carrying out the image communication by using facsimile, at first a receiving facsimile is called from a sending facsimile. Responding to the call from the sending facsimile, the receiving facsimile has to make a line connection, and then send a protocol signal. The sending facsimile waits until receiving the protocol signal from the facsimile on the caller side. When the facsimile on the caller side carrys out its sending operation automatically, using a so-called automatic sending function, the facsimile on the caller side determines that the terminal on the receiver side is not a facsimile, and subsequently disconnects the line when the facsimile on the caller side does not receive the protocol signal from the facsimile on the receiver side within a predetermined time (about 20 to 30 seconds).

If the facsimile on the receiver side returns the protocol signal within the predetermined time to the facsimile on the caller side, it carries out the sending operation by using the automatic sending function. In a receiver side facsimile which also has an automatic telephone answering function by which the message of the caller can be recorded, however, a total time of below mentioned three kinds of times must be within the predetermined time (about 20 to 30 seconds) or else the sending facsimile will time out too soon.

(1) a sending time for sending a response message to the caller, (2) a determining time for determining whether the caller wishes to use facsimile communication or voice communication by response of the terminal on caller side to above mentioned response message, and (3) a sending time for sending the protocol signal to the terminal on caller side in case of determining that the terminal on caller side intends to make a facsimile communication.

Thus, in the prior art, there is a difficulty that a time in which the response message played to a caller who wishes to record voice message can be sent, is very small.

OBJECT AND SUMMARY OF THE INVENTION

It is an object of the present invention to provide a terminal apparatus which can receive both of a voice signal and a facsimile signal and can automatically respond even in the absence of an operator, such as during going out or at night in the office, and to provide a terminal apparatus which comprises calling signal detection means for detecting a calling signal from a telephone circuit, response message means for reproducing first and second response messages and sending them on the telephone circuit, image signal receiving means for receiving image signal from the telephone circuit, no voice detection means which output no voice detection signal responding to continuation of no voice status of the telephone circuit for a predetermined time, voice signal detection means which output voice detection signal responding to voice signal on the telephone circuit, incoming message recording means for recording the voice signal from the telephone circuit, and control means which control the response message means to send the first response message on the telephone circuit responding to detection of calling signal detection means, control the image signal receiving means to active state when the no voice detection signal is output from the no voice detection means after sending the first response message, and control the response message means to send the second response message on the telephone circuit and then control the incoming message recording means to active state when the voice detection signal is output from the voice signal detection means after sending the first response message; the terminal apparatus of the present invention sends information of receiver side at first by sending brief response message, and then when the voice signal is detected the terminal apparatus responds by further detail response message and records the voice signal (message) in the voice recording device, when the no voice status is detected the terminal apparatus determines that the terminal on caller side is facsimile and records images signal from the facsimile in the facsimile device. While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 3 is a flow chart for showing operation of a first embodiment of the terminal apparatus of FIG. 1.

FIG. 4 is a flow chart for showing operation of a second embodiment of a terminal apparatus.

DETAILED DESCRIPTION OF PREFERRED EMBODIMENTS

Figure 1:
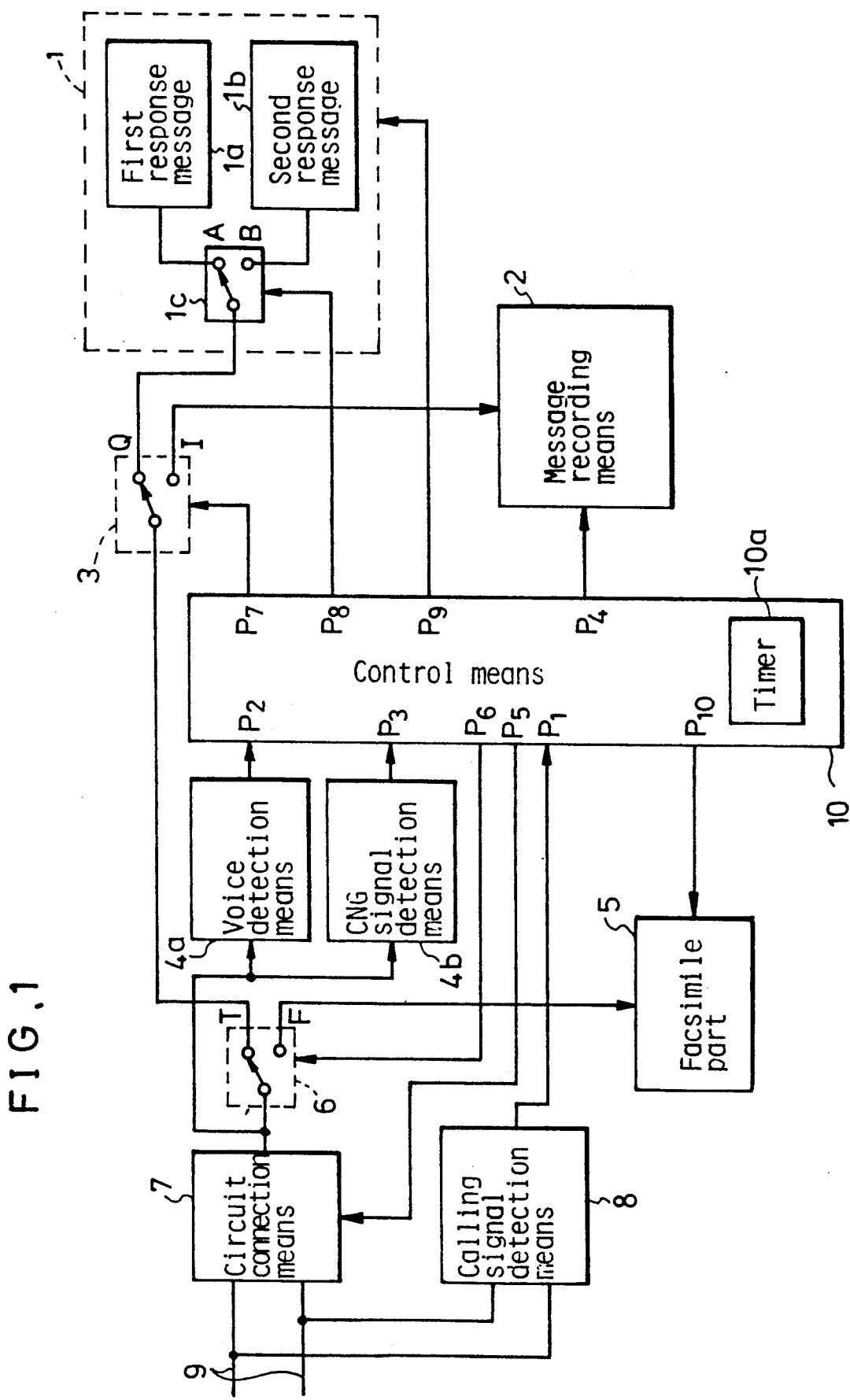
FIG. 1 is a block diagram of a terminal apparatus of a first embodiment of the present invention.

Referring now to the drawings, a first embodiment of the present invention will be described.

Figure 2:
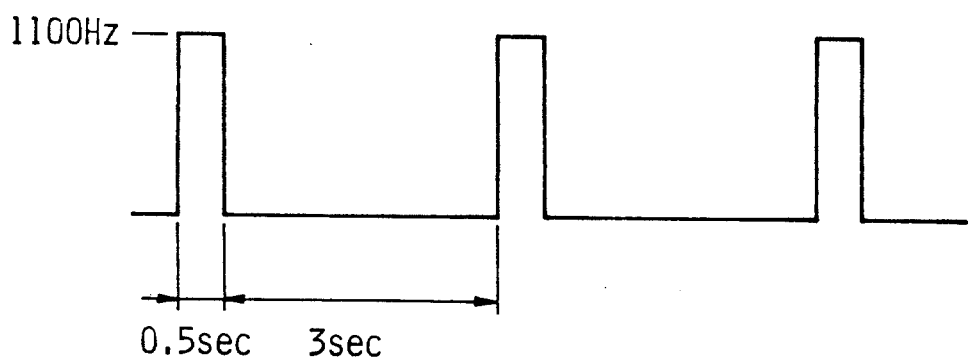
FIG. 2 is a wave form of a CNG signal.

FIG. 1 shows a block diagram of a terminal apparatus of the first embodiment of the present invention. In FIG. 1, response message means 1 has reproduce means 1a and 1b for first and second response messages and has a first change-over switch 1c. Incoming message recording means 2 is for recording a voice signal (incoming message) from the caller through the telephone line. Second change-over switch 3 selectively connects either the response message means 1 or the incoming message recording means 2 to the telephone line. Voice signal detection means 4a detects whether or not there is a voice signal in the telephone line. CNG signal detection means 4b detects a CNG signal which is a calling tone as described in recommendation Rec. T30 of the international telegram and telephone consultative committee. A sample waveform of a CNG signal is shown in FIG. 2. Facsimile part 5 receives an image signal from the caller side. Third change-over switch 6 selectively connects the signal from caller side to the facsimile part 5 the response message means 1 or to change-over switch 3 itself connected to the incoming message recording means 2 and response message. Circuit connection means 7 is for connection and disconnection of the telephone circuit 9. Calling signal detection means 8 detects a calling signal from the telephone circuit 9. Control means 10 is constituted by a microcomputer and controls this system.

Referring now to the flow chart shown in FIG. 3, operation of the first embodiment of the facsimile machine with the automatic telephone answering function is described hereafter. When the calling signal arrives, it is detected by the calling signal detection means 8. The detection signal is input to a terminal P1 of control means 10 (step 1). Responding to this detection signal, the control means 10 outputs the control signal from an output terminal P5 and connects the telephone circuit by changing the circuit connection means 7 to an ON state (step 2). Then, the control means 10 outputs a control signal from the output terminal 6 to change over the third switch 6 to the "T" side, which connects the signal to the voice part of the apparatus. Further, the control means 10 changes over the second switch 3 to "Q" side by outputting the control signal from its output terminal P7 to the latter, and further changes the first switch 1c of response message means 1 to its "A" side by outputting the control signal from its output terminal P8 to the latter. Then the control means 10 activates the response message means 1 by outputting a control signal from the output terminal P9 to the latter. The response message means 1 outputs the first response message "Hello, this is ***. May I have your name, please" to the telephone circuit 9 from the reproducing means 1a for first response message (step 3). Further, the control means 10 makes built-in timer means 10a start a count of the elapsed time. The timer means 10a is designed, for instance to output the time-up signal when a period of 7 seconds is counted (step 4). The signal from the telephone circuit 9 is inputted to the voice detection means 4a and CNG signal detection means 4b through the circuit connection means 7 and the third change-over switch 6. The detection signal of voice detection means 4a is inputted to an input terminals P2 of control means 10, and the detection signal of CNG signal detection means 4b is inputted to an input terminal P3 of control means 10. The control means 1 starts sampling the input signal on its input terminal P2 to determine whether or not there is a voice signal (step 5). When a determination of no voice signal is made, the control means 10 increments the timer means 10a and then determines whether the timer means 10a has completed counting or not (step 12). When the timer means 10a is not yet completed, the step 5 is repeated. When the timer means 10a has completed, (that is, a no voice state is continued for 7 seconds), a step 13 is carried out.

When any signal (such as a voice signal, for recording a message from caller noise surrounding the handset on caller side or control signal from caller side facsimile device in automatic mode) from the caller side is detected responding to said first response message, the control means 10 determines whether or not the signal is a CNG signal such as shown in FIG. 2 (step 7). When the CNG signal is detected, the step 13 is carried out.

When the CNG signal is not detected at step 7, the signal from telephone circuit 9 is judged as a signal other than a voice signal, noise or CNG signal. Then, when the frequency (or the cycle) of this signal is not constant, the control means 10 determines that this signal is one of a voice signal or noise, and carries out the step 10. In step 8, when a continuous sound or an intermittent sound having a constant frequency or cycle is detected, a step 9 is carried out. In the step 9, the timer means 10 is incremented and then it is determined whether the timer means 10a is completed or not. When the timer means 10a is not completed, the step 5 is carried out. This operation detects the CNG signal again until the timer is completed, even when the control means 10 fails to detect a CNG signal. In step 9, the timer means 10a is completed, and step 10 is carried out.

The control means 10 changes the third change-over switch 6 to the "T" side by outputting the control signal on the output terminal P6, changes the second change-over switch 3 to the "Q" side by outputting the control signal on the output terminal P7 and changes the first change over switch 1c of response message means 1 to the "B" side by outputting the control signal on the output terminal 8. Then the control means 10 activates the response message means by outputting a control signal on the output terminal 9 for sending the second response message that "Would you please leave your name and message after you hear the recording tone" from reproduce means 1b to the telephone line 9 (step 10). The control means 10 changes the second change-over switch 3 to the "I" side by outputting the control signal on the output terminal P7 and activates the receiving recording means 2 by outputting the control signal on the output terminal P4 for recording the message from caller on the recording medium (magnetic tape etc.) of receiving recording means 2 (step 11). When the recording operation for the message from the caller is completed, the step 14 is carried out.

In step 13, the control means 10 changes third change-over switch 6 to the "F" side to couple the signal to the facsimile part 5, by outputting the control signal on the output terminal P6 control means 5 activate facsimile part 5 for receiving the facsimile signal from the caller. When the receiving operation of facsimile signal is completed, step 14 is carried out.

In step 14, the control means 10 changes the circuit connection means 7 into its OFF state by outputting the control signal on the output terminal P5 for disconnecting the telephone circuit to wait for the next signal.

Referring now to the drawings, a second embodiment of the present invention is described hereafter.

The hardware structure of a terminal apparatus of the second embodiment of the present invention is the same as the first embodiment shown in FIG. 1.

Referring now to flow chart shown in FIG. 4, an operation of a facsimile machine with the automatic telephone answering function of the second embodiment is described hereafter. When the calling signal arrives, it is detected by the calling signal detection means 8. The detection signal is inputted to a terminal P1 of control means 10 (step 1). Responding to this detection signal, the control means 10 outputs the control signal from an output terminal P5 to connect the telephone circuit to the apparatus by changing to circuit connection means 7 into an ON state (step 2). Then, the control means 10 outputs a control signal from the output terminal 6 to change over the third switch 6 to the "T" side. Further, the control means 10 changes over the second switch 3 to the "Q" side by outputting the control signal from its output terminal P7 to the latter, and further changes the first switch 1c of response message means 1 to the "A" side by outputting the control signal from its output terminal P8 to the latter. Then the control means 10 activates the response message means 1 by outputting a control signal from the output terminal P9 to the latter. The response message means 1 outputs the first response message "Hello, this is ***. May I have your name, please" to the telephone circuit 9 from reproducing means 1a for first response message (step 3). Then, a flag register "OGMF" is reset (step 4). Further, the control means 10 starts the counting by built-in timer means 10a. The timer means 10a is designed, for instance, to output a time-up signal when a period of 7 seconds is counted (step 5). The signal from the telephone circuit 9 is inputted to the voice detection means 4a and CNG signal detection means 4b through the circuit connection means 7 and the third change-over switch 6. The detection signal of voice detection means 4a is inputted to an input terminal P2 of control means 10, and the detection signal of CNG signal detection means 4b is inputted to an input terminal P3 of control means 10. The control means 1 starts sampling the inputted signal on the input terminal P2 for determining whether or not there is a voice signal (step 6). When the voice signal is not received (e.g. when the caller is not speaking as he desires facsimile communication), the control means 10 increments the timer means 10a and then determines whether or not the timer means 10a has completed counting (step 11). When the timer means 10a is not yet completed with its counting operation, the step 5 is repeated. When the timer means 10a has completed (when the no voice state is continued for 7 seconds), a step 12 is carried out.

When any signal (such as a voice signal for recording a message from the caller, noise surrounding the handset on the caller side or a control signal from the caller side from facsimile device in its automatic mode) from the caller side is detected responding to said first response message, the control means 10 determines whether or not the signal is the CNG signal (step 8). When the CNG signal is detected, the step 12 is carried out.

When the CNG signal is not detected at step 8, the signal from telephone circuit 9 is judged as being a signal other than the voice signal, a noise signal or a CNG signal. Then, when the frequency (or the cycle) of this signal is not constant, the control means 10 determines that this signal is one of a voice signal or noise, and carries out the step 15. In step 9, when a continuous sound or intermittent sound having a constant frequency or cycle is detected, the step 10 is carried out. In the step 10, the timer means 10 is incremented and then it is determined whether or not the timer means 10a is completed. When the timer means 10a is not completed with its timing cycle, the step 6 is carried out. By this operation, the detection for CNG can be carried out again until the timer is completed, even when the control means 10 fails to detect a CNG signal in step 8. In step 10, the timer means 10a is completed, and step 10 is carried out.

At this time, the control means 10 examines the flag register "OGMF". Because the flag register "OGMF" is reset at step 4, the control means 10 sets the flag register "OGMF" at step 16 Then, the control means 10 changes the third change-over switch 6 to the "T" side by outputting a control signal on the output terminal P6, changes the second change-over switch 3 to the "Q" side by outputting the control signal on the output terminal P7 and changes the first change-over switch 1c of response message means 1 to the "B" side by outputting the control signal on the output terminal P8. Then the control means changes the response message means to the active state by outputting the control signal on the output terminal P9 for sending to the telephone line 9 the second response message that "Would you please leave your name and message after you hear the recording tone. If you wish to make a facsimile communication, please be silent for 7 seconds. Then, please push your sending switch after you hear the waiting signal tone" from reproducing means 1b of second response message means (step 17). The control means 10 changes the second change-over switch 3 to the "I" side by outputting the control signal on the output terminal P7 and changes the receiving recording means 2 to its active state by outputting the control signal on the output terminal P4 for recording the message from the caller (step 18). Then in the step 5, the timer means is started again and the no voice state or CNG signal is detected.

The operation for detecting the no voice state, voice signal and CNG signal on the telephone circuit by the control means 10 has been described above. When the no voice state or CNG signal is detected, the image signal mode is selected at step 12. When the voice signal is detected, the recording operation of receiving message is continued. In step 15, the flag register "OGMF" is examined. Because the flag register was set (step 16) at the time of first changing of the recording mode for receiving the message, the step 19 is carried out from the next time. The control means 10 examines whether or not the recording operation for receiving the message is completed. This examination can be carried by detecting the elapse of a predetermined time (for example 30 seconds) after starting the recording or by detecting a momentary disconnection of current on the telephone circuit which occurs at the end of the speaking by the caller. When the recording operation is not completed, the step 5 is carried out again. When the recording operation is completed, the step 20 is carried out.

In step 12, the control means 10 examines the flag register "OGMF". When the flag register is reset, the step 14 is carried out. When the flag register is set, the control means 10 makes the receiving message means 2 stop for stopping the recording of receiving message (step 13) and carries out step 14. In the step 14, the control means 10 changes the third change-over switch 6 to the "F" side by outputting the control signal on the output terminal P6 and changes facsimile part 5 to its active state by outputting the control signal on the output terminal P10 for receiving the facsimile signal from the caller side. When the receiving of the facsimile signal is completed, the step 20 is carried out.

In step 20, the control means 10 makes the telephone circuit disconnect by controlling the circuit connection means 7.

Although the invention has been described in its preferred form with a certain degree of particularity, it is understood that the present disclosure of the preferred form may be changed in the details of construction and the combination and arrangement of parts may be resorted to without departing from the spirit and the scope of the invention as hereinafter claimed.

What is claimed is:

1. A method of communicating a telephone circuit with a message recording structure and an image receiving structure comprising the steps of:
   detecting a calling signal from the telephone circuit;
   sending a response message on said telephone circuit upon receiving said calling signal;
   detecting a voice signal on said telephone circuit at a first time after sending said response message;
   detecting a voice signal on said telephone circuit at a second time subsequent to said first time;
   determining a no-voice state when said voice detection signal is not present at either said first time or said second time;
   detecting a calling tone indicative of an incoming image signal which is automatically sent by the calling party;
   controlling an image receiving means to receive an image signal from said telephone circuit when said no-voice state is determined and to receive said image signal immediately when detecting said calling tone; and
   recording an incoming message when the voice detection signal is detected after sending the response message.

2. A method as in claim 1 wherein said image receiving structure is a facsimile machine and further comprising the step of sending a second message before recording said incoming message.

3. A terminal apparatus adapted to interface with a telephone circuit comprising:
   calling signal detection means for detecting a calling signal from the telephone circuit;
   response message means for storing at least one response message and for playing said at least one response message on said telephone circuit;
   image signal receiving means having an active state in which it receives image signals from said telephone circuit;
   voice signal detection means for determining an input signal having a non-constant frequency as being a voice signal, and producing a voice detection signal in response to a detection of said voice signal on said telephone circuit;
   CNG signal detection means for detecting a CNG signal which is automatically sent by the calling party indicative of an incoming image signal for substantially immediately starting said image signal receiving means responsive to reception of said CNG signal;
   incoming message recording means having an active state in which it records said voice signal from said telephone circuit; and
   control means for: 1) controlling said response message means to send said response message on said telephone circuit responding to said detecting by said calling signal detection means, 2) checking said voice signal detection means at a first time after sending said responsive message, and then at a second time subsequent to said first time, and determining a no-voice state only when said voice detection signal is not present at either said first time or said second time, 3) controlling said image signal receiving means to said active state when said no voice state is detected, 4) controlling said incoming message recording means to said active state to record incoming messages only when said voice detection signal is output from said voice signal detection means after sending said response message, and 5) controlling said image signal receiving means to said active state to immediately receive said image signal when the CNG signal is detected by said CNG signal detection means.

4. A terminal apparatus adapted to interface with a telephone circuit comprising:
   calling signal detection means for detecting a calling signal from the telephone circuit;
   response message means for reproducing plural response messages and selectively sending them on said telephone circuit;
   image signal receiving means having an active state in which it receives facsimile signals from said telephone circuit;
   voice signal detection means for determining an input signal having a non-constant frequency as being a voice signal, and producing a voice detection signal in response to a detection of said voice signal on said telephone circuit;
   CNG signal detection means for detecting a CNG signal on said telephone circuit;
   incoming message recording means having an active state in which it records said voice signal from said telephone circuit; and
   control means for: 1) controlling said response message means to send said response message on said telephone circuit upon said detecting said calling signal by said calling signal detection means, 2) checking said voice signal detection means at a first time after sending said response message, and then again at a second time subsequent to said first time, and determining a no-voice state only when said voice detection signal is not present at either said first time or said second time, 3) controlling said image signal receiving means to said active state to thereby initiate receiving image signals from said telephone circuit when said no voice state is detected, 4) controlling said response message means to send a second response message on said telephone circuit and then controlling said incoming message recording means to said active state only when said voice detection signal is detected after said first response message, and 5) controlling said image signal receiving means to immediately receive a facsimile signal on said telephone circuit when the CNG signal is detected.

5. An apparatus as in claim 3 wherein said image signals are facsimile signals and said at least one response message includes an instruction to either leave a message or wait a predetermined period of time for facsimile communication.

6. An apparatus as in claim 3 further comprising a first switch for connecting the telephone circuit to either said image signal receiving means, or to a second branch including said response message means and said incoming message recording means, and a second switch for selectively switching a signal going towards said second branch to one of said message recording means and said response message means.

7. An apparatus as in claim 4 wherein said first message includes an instruction to either leave a message or wait a predetermined period of time for facsimile communication.

8. An apparatus as in claim 4 further comprising a first switch for connecting the telephone circuit to either said image signal receiving means, or to a second branch including said response message means and said incoming message recording means, and a second switch for selectively switching a signal going towards said message to one of said message recording means and said response message means.

* * * * *